Aug. 25, 1964    J. C. LEE ET AL    3,145,734
PRESSURE COMPENSATED FLOW CONTROL VALVE
Filed Oct. 6, 1961    6 Sheets-Sheet 1

Inventors:
John C. Lee
Yunus E. Moochhala
and Herbert N. Underwood
By: John W. Butcher Atty.

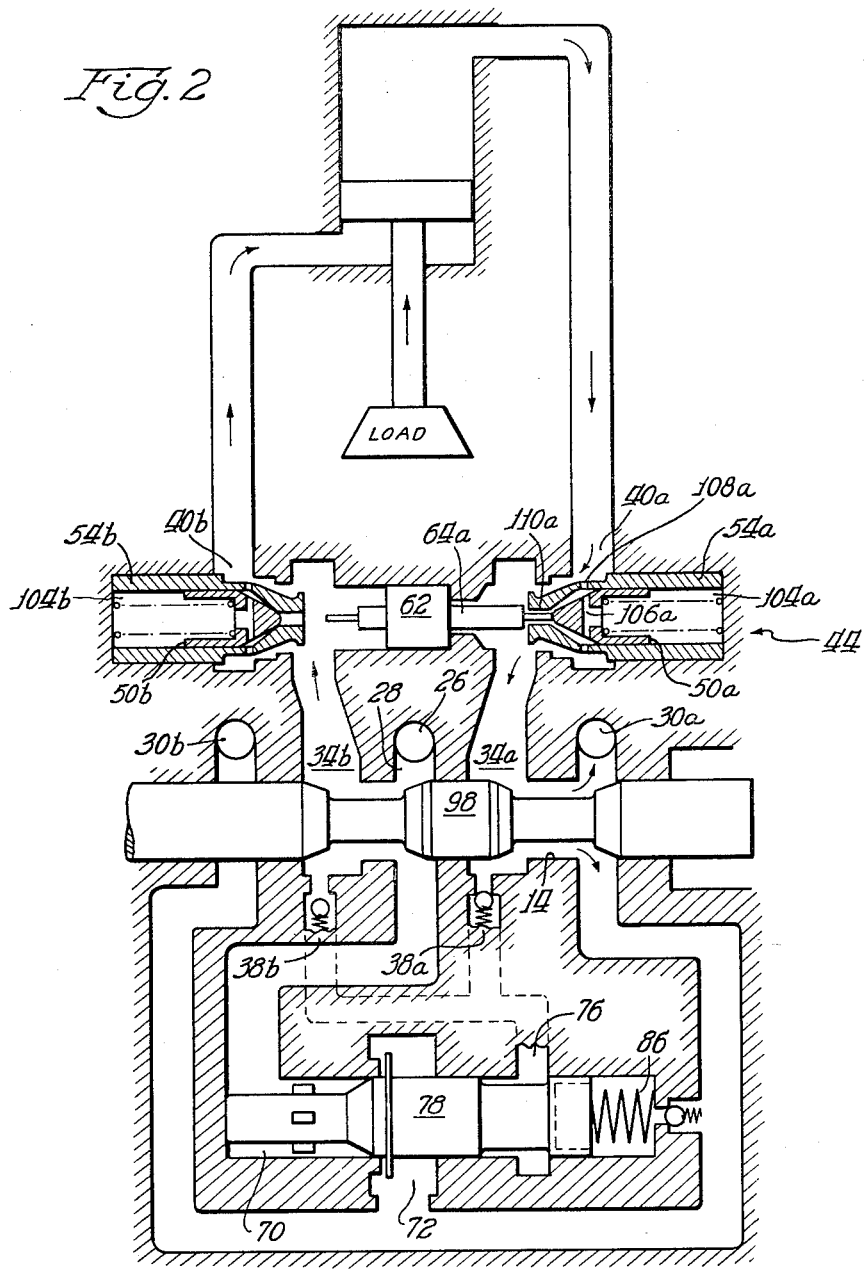

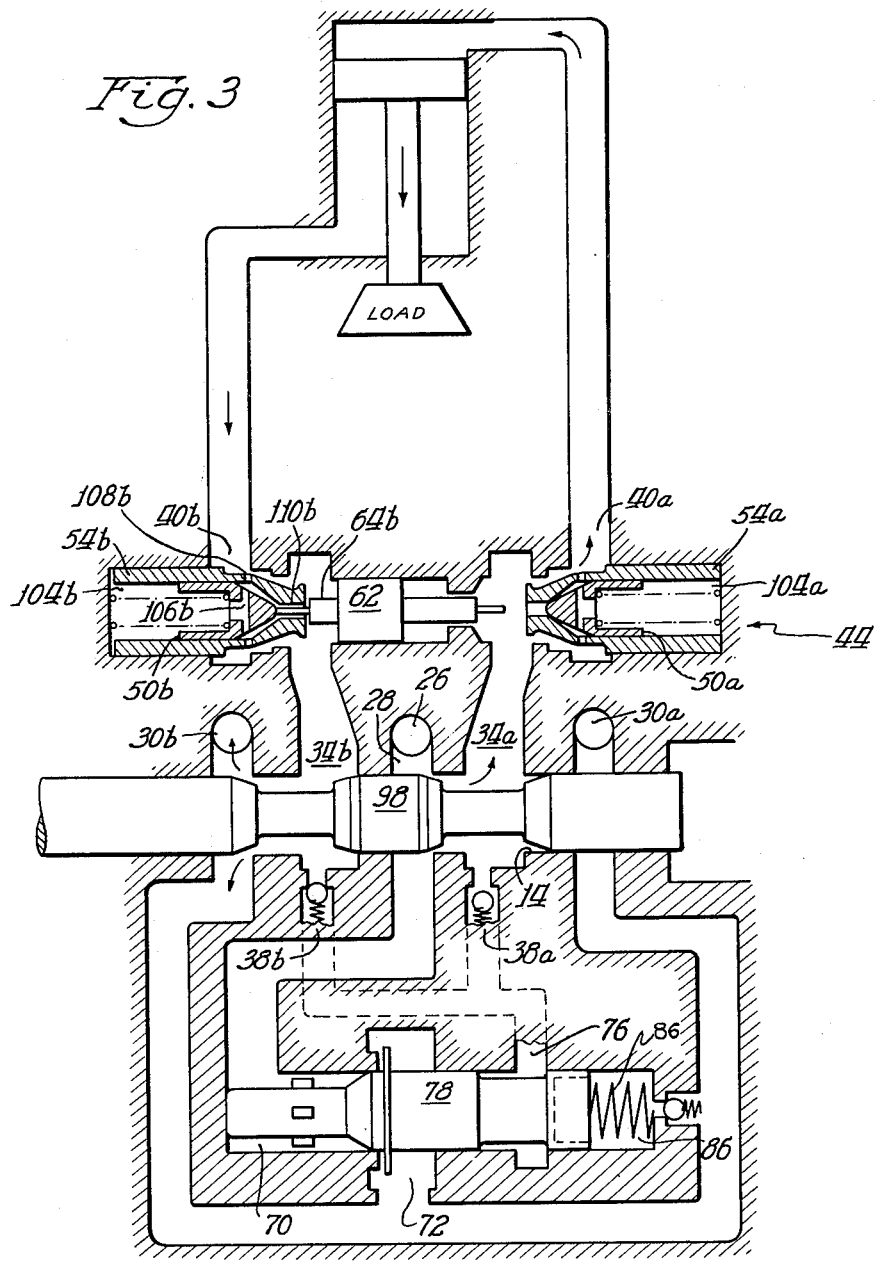

Aug. 25, 1964    J. C. LEE ET AL    3,145,734
PRESSURE COMPENSATED FLOW CONTROL VALVE
Filed Oct. 6, 1961    6 Sheets-Sheet 4

Inventors:
John C. Lee
Yunus E. Moochhala
and Herbert N. Underwood
By: John W. Butcher  Atty.

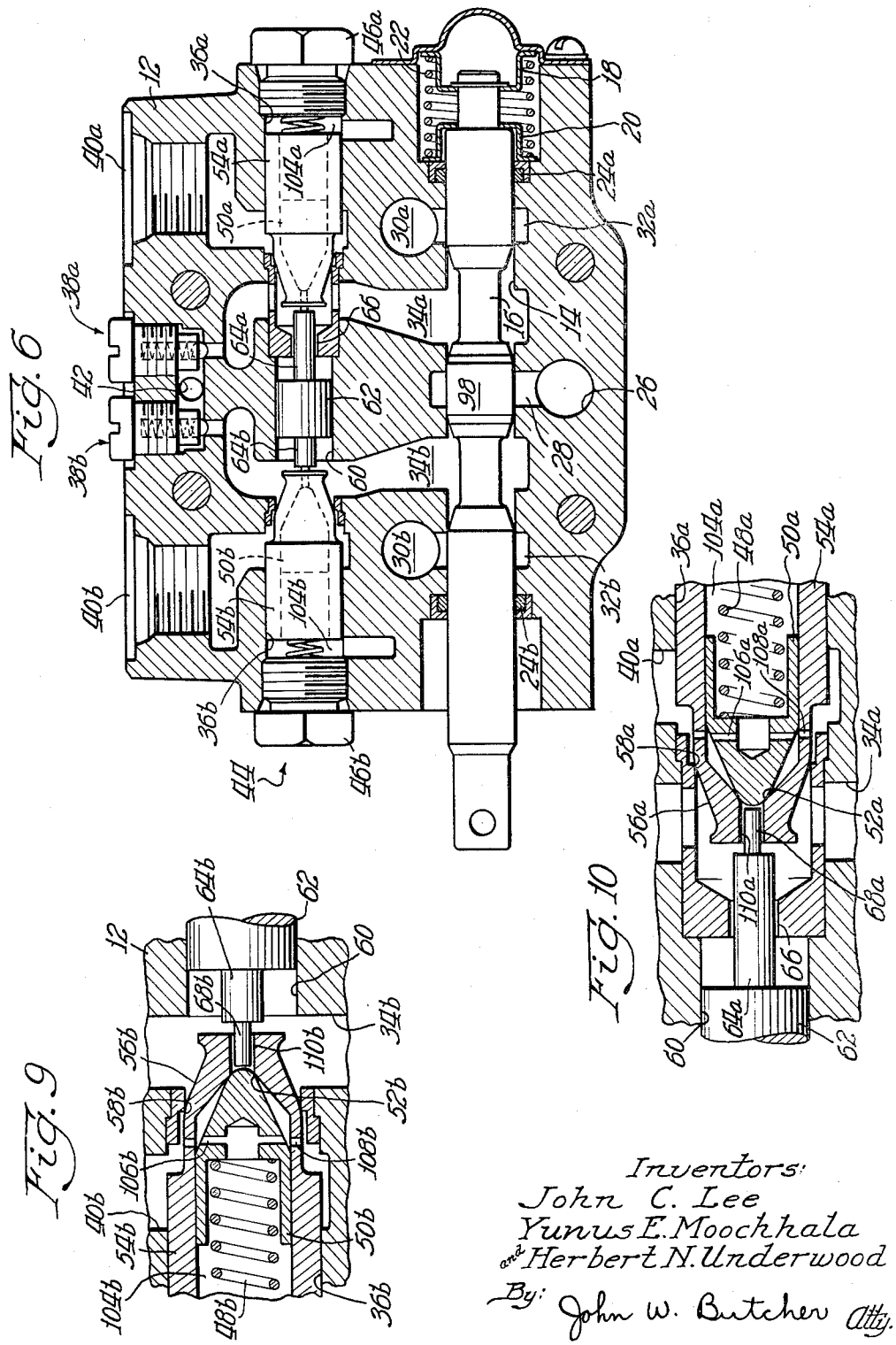

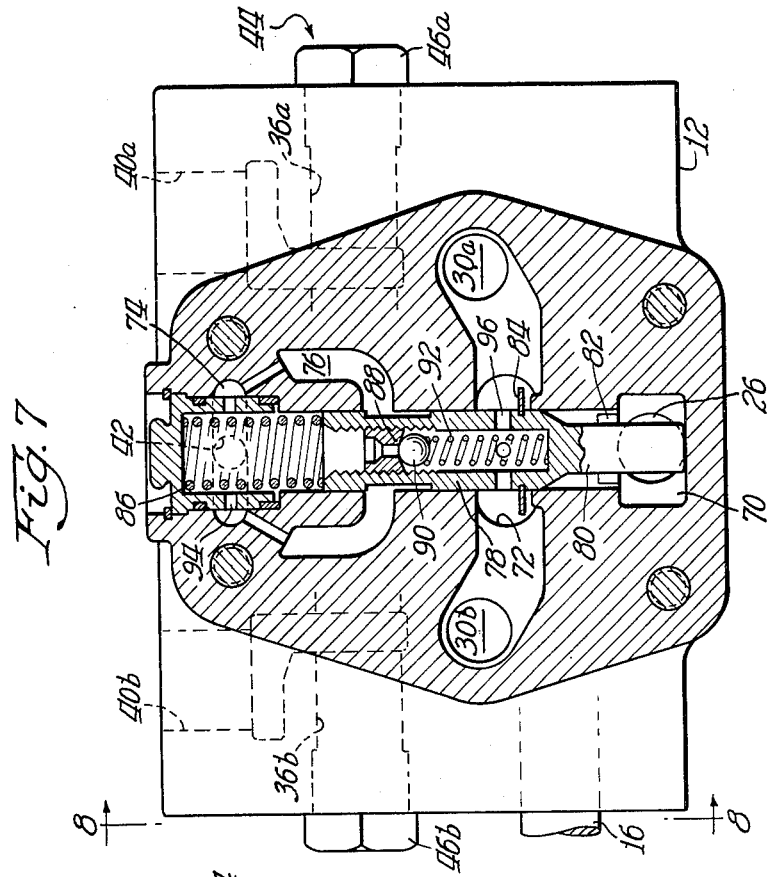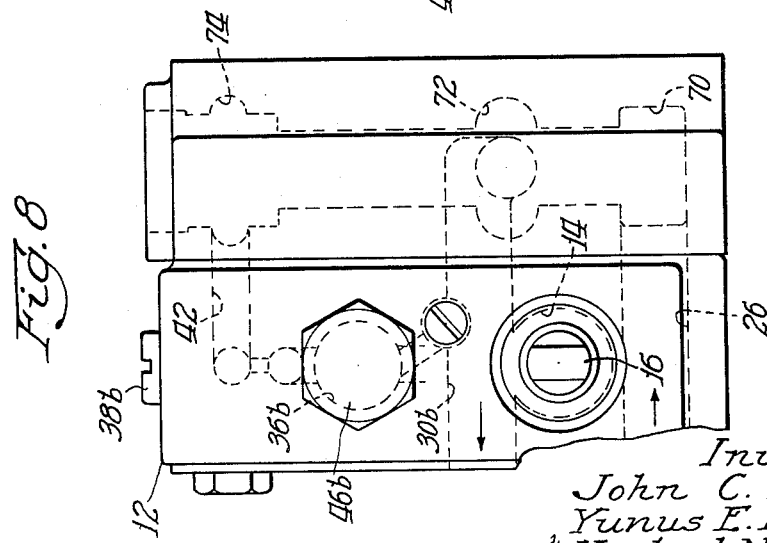

United States Patent Office 3,145,734
Patented Aug. 25, 1964

3,145,734
PRESSURE COMPENSATED FLOW
CONTROL VALVE
John C. Lee, Mount Prospect, Yunus E. Moochhala, Northfield, and Herbert N. Underwood, Chicago, Ill., assignors to Borg-Warner Corporation, Chicago, Ill., a corporation of Illinois
Filed Oct. 6, 1961, Ser. No. 143,383
8 Claims. (Cl. 137—596.13)

This invention relates to flow control valves and more particularly to a multiple port flow control valve of the type generally employed to govern the operation of load actuators such as hydraulic motors, hydraulic cylinders and the like.

In many installations in which these load actuators are used, for any given valve spool setting or displacement, the speed of the movement of the load varies with the magnitude and with the direction of the load being moved. In the case of lifting a heavy load with a conventional hydraulic cylinder, the valve spool must be displaced near the end of its stroke before the load will respond to the load actuator. In the case of lowering a load, the valve spool must be displaced only a small amount of its stroke before the load will respond to the load actuator. In the case of lowering a heavy load, the weight of the load, in the absence of an anti-cavitation valve in the flow control valve system, will cause a rapid lowering of the load which in turn will cause cavitation in the hydraulic cylinder. This is, of course, an undesirable feature.

Fluid inlet passages located in the body portion of the flow control valve section are positioned such that when the flow control valve sections are combined in a group, the respective fluid inlet passages of the flow control valve sections are aligned to form a manifold supply flow path. The term "manifolded supply flow path," as used herein, is defined as a passage providing for the direct delivery of fluid to any of the valve spool bores without having to go through a multitude of valve spool passages and as a passage providing for the delivery of fluid to a single fluid pressure actuated bypass valve. This feature provides a substantially constant pressure drop through the bypass valve and provides an unimpeded flow path through the flow control valve. This arrangement is further characterized in that upon the initial admission of fluid from the supply flow path into the spool bore, the fluid pressure actuated bypass moves to restrict flow through the bypass. Fluid sump passages located in the body portion of the flow control valve section are positioned such that when the flow control valve sections are combined in a group the respective fluid sump passages are aligned to form a sump flow path.

A single bypass valve is employed to control flow of fluid between the supply flow path and the sump flow path of the flow control valve. This bypass valve is responsive to the initial admission of inlet fluid to the spool bore such that a resilient member is effective to restrict the flow of fluid through the bypass valve. Upon initial flow of fluid within the port carrying the fluid being supplied to the load actuator, the bypass valve becomes responsive to the pressure differential between the fluid in the supply flow path and the fluid in the port branch carrying the fluid being supplied to the load actuator. This enables the bypass valve to control the flow of fluid therethrough such that the flow through the bypass varies inversely with the flow through the above mentioned port branch.

A throttling valve provides a means to prevent the flow of fluid through the work ports, i.e., the port adapted to carry the fluid being directed to the load actuator and the port adapted to carry the fluid being returned from the load actuator, until the pressure of the fluid in the supply flow path exceeds the pressure of the fluid in the load actuator at which time the throttling valve becomes responsive to the pressure differential between the work ports. The throttling valve controls the flow of fluid being returned from the load actuator such that the rate of flow of fluid returning from the load actuator corresponds with the rate of flow of fluid entering the load actuator. The throttling valve is preferably located intermediate the spool bore and the load actuator to provide a positive anti-creep (holding of the load) feature when the valve spool is in a neutral position. This preferred arrangement mitigates the problem of leakage of fluid from the load actuator across the valve spool into the sump passages.

FIGURE 2 is a schematic view of the flow control valve section and its associated load with the valve spool in a position such that the flow of fluid to and away from the load actuator is such that the load may be raised;

FIGURE 3 is a schematic view of the flow control valve section and its associated load with the valve spool in a position such that the flow of fluid to and away from the load actuator is such that the load may be lowered;

FIGURE 6 is a view, partially in cross section, of the flow control valve section;

FIGURE 7 is a view, partially in cross section, of the bypass portion of the flow control valve;

FIGURE 8 is a view taken along section lines 8—8 of FIGURE 7;

FIGURE 9 is an enlarged view of the left-hand portion of the throttling valve; and FIGURE 10 is an enlarged view of the right-hand portion of the throttling valve.

Figure 1:
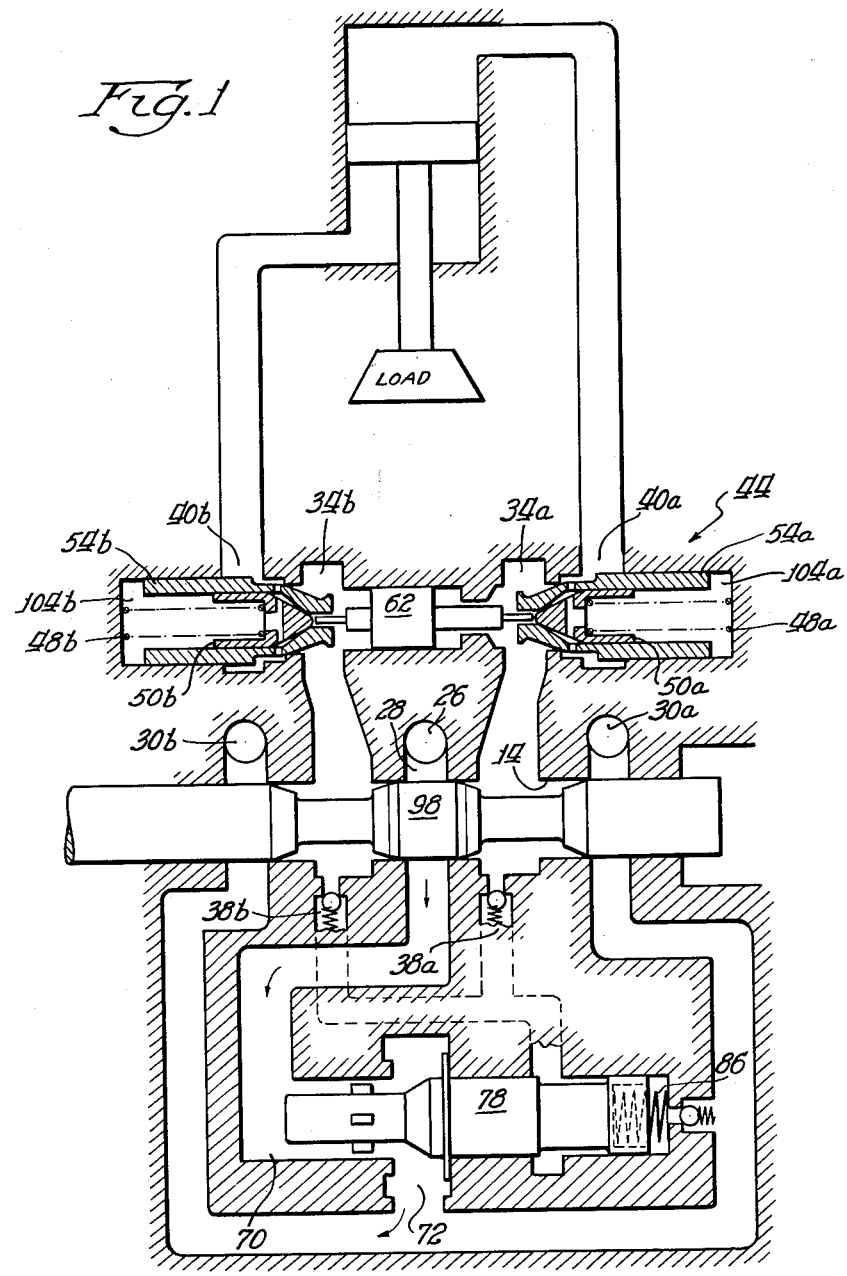
FIGURE 1 is a schematic view of the flow control valve section and its associated load with the valve spool in a neutral position such that the flow of fluid to and away from the load actuator is such that the load may be maintained stationary.

Referring now to the drawing and more particularly to FIGURE 6 the valve body portion 12 is provided with a spool bore 14 therethrough. A valve spool 16 is positioned within the spool bore 14. A centering device is attached to one end of the valve spool. The centering device includes a first thrust washer 18, a second thrust washer 20 and a resilient member 22. Seal members 24a and 24b are provided on opposite ends of the valve spool to insure against leakage of fluid from the clearance spaces between the valve spool 16 and the spool bore 14.

A fluid inlet passage 26 preferably extends through the body portion 12 adjacent the mid-portion thereof. An inlet branch 28 extends from the inlet passage 26 into the spool bore 14.

A plurality of fluid sump passages 30a and 30b extend through the body portion 12 on opposite sides of the fluid inlet passage 26. Sump branches 32a and 32b extend from the sump passages 30a and 30b into the spool bore 14. Working port branches 34a and 34b extend from the spool bore 14 to a throttling valve bore 36a and 36b. Each of the port branches 34a and 34b communicate with check valves 38a and 38b as well as working ports 40a and 40b. Check valve 38a is arranged to admit fluid from port branch 34a into bypass valve control branch 42 and check valve 38b is arranged to admit fluid from port branch 34b into bypass control branch 42.

The throttling valve assembly 44 includes stop nuts 46a and 46b each of which act against pilot springs 48a and 48b. Each of the pilot springs 48a and 48b act against throttling pilot plungers 50a and 50b which plungers seat within internal seats 52a and 52b. Throttling plungers 54a and 54b are adapted to reciprocate within throttling valve bores 36a and 36b. The throttling plungers 54a and 54b include tapered portions 56a and 56b which are adapted to seat against stepped shoulders 58a and 58b.

A pilot actuator 62 is positioned within an actuator bore 60. The pilot actuator includes a piston 62 and oppositely extending rods 64a and 64b. Clearances 66 provide a fluid dampener for movement of the piston 62 within the actuator bore 60. Reduced portions 68a and 68b extend through the end of throttling plungers 54a and 54b and are adapted to engage the end of throttling pilot plungers 50a and 50b.

The bypass valve portion of the flow control valve, FIGURE 7 is arranged such that only one bypass valve is required with each group of flow control valve sections. The bypass valve has an inlet chamber 70 which is in communication with each of the fluid inlet passages 26 of the individual flow control valve sections. A sump chamber 72 is in communication with the fluid sump passages 30a and 30b of the individual flow control valve sections. A control chamber 74 is in communication with the bypass control branch 42 of the individual flow control valve sections. An equalizing line 76 extends from the control chamber 74 to a point intermediate the ends of the bypass valve body 78.

The bypass valve body 78 includes a guide 80 and guide vanes 82. A flow deflector 84 is provided on the valve body. A resilient member 86 urges the bypass valve body 78 toward a position such that the bypass valve body 78 restricts flow of fluid from the inlet chamber 70 into the sump chamber 72. A bypass relief pilot seal 88 is provided within the bypass valve body 78. A bypass pilot plunger 90 is urged toward engagement with the bypass pilot seat 88 by the bypass pilot resilent member 92. Control chamber ports 94 provide communication between the control chamber 74 and the interior of the bypass valve body 78. Sump chamber ports 96 provide communication between the sump chamber 72 and the interior of the bypass valve body 78.

The valve of the present invention is illustrated in a typical installation in FIGS. 1–3 wherein the valve spool is arranged to assume a position to maintain a load in a fixed location, to assume a position to lift a load, and to assume a position to lower a load.

FIG. 1 illustrates the valve spool in a position to maintain a load in a fixed position. Fluid, under pressure, is supplied to the valve body by way of the fluid inlet passage 26. The fluid inlet passage has an inlet branch 28 extending into the valve spool bore 14. An intermediate land 98 of the valve spool prevents the flow of fluid from the inlet branch 28 into the spool bore 14. Thus fluid passes around the intermediate land 98 of the valve spool into the inlet chamber 70 of the bypass valve. The pressure of fluid in the inlet chamber 70 exceeds the pressure of fluid in the sump chamber 72 by an amount sufficient to overcome the action of the bypass spring 86 and thus the bypass valve is forced open to permit fluid to flow from the inlet passage 26 to the sump passages 30a and 30b. The throttling valve assembly 44 is maintained in a closed position and the load is held stationary.

FIG. 2 illustrates the valve spool displaced to the right with respect to the valve body. Fluid, under pressure, is supplied to the valve body by way of fluid inlet passage 26 and inlet branch 28. The intermediate land 98 of the valve spool admits an initial charge of fluid from the inlet branch 28 into the spool bore 14. The initial charge of fluid lifts check valve 38b from its seat and thus equalizes the pressure of the fluid in the equalizing line 76 with the pressure of the fluid in inlet chamber 70 and thus allows the resilient bypass spring 86 to move the bypass valve to restrict the flow of fluid through the bypass valve. As the pressure in port branch 34b reaches a value sufficient to lift the throttling plunger 54b from its seat and to lift the load, the bypass valve becomes responsive to the differential between the pressure of fluid in the inlet branch 28 and the pressure of the fluid in the port branch 34b. This permits the bypass valve to restrict the flow of fluid therethrough according to the flow of fluid through port 40b. Fluid in port branch 34b acts against the left face of piston 62 and thus moves the piston to the right. The rod 64a lifts the throttling pilot plunger 50a from its seat and thus permits fluid to flow from port 40a through plunger holes 108a into the port branch 34a by way of rod hole 110a. Pilot plunger chamber 104a is relieved of pressure by way of vent holes 106a. Fluid in port 40a moves the throttling plunger 54a to the right and throttles the flow of fluid from port 40a to port branch 34a in accordance with the flow of fluid through port 40b. Thus the load is lifted at a rate substantially proportional to the opening of the valve spool.

FIG. 3 illustrates the valve spool displaced to the left with respect to the valve body. Fluid, under pressure, is supplied to the valve body by way of fluid inlet passage 26 and inlet branch 28. The intermediate land 98 of the valve spool admits an initial charge of fluid from the inlet branch 28 into the spool bore 14. The initial charge of fluid lifts check valve 38a from its seat and thus equilizes the pressure of the fluid in the equalizing line 76 with the pressure of the fluid in the inlet chamber 70 and thus allows the resilient member 86 to move the bypass valve to restrict the flow of fluid therethrough. As the pressure in the port branch 34a reaches a value sufficient to lift the throttling plunger 54a from its seat and to move the load, the bypass valve becomes responsive to the differential between the pressure of the fluid in the inlet branch 28 and the pressure of the fluid in the port branch 34a. This permits the bypass valve to restrict the flow of fluid therethrough according to the flow of fluid through port 40a. Fluid in port branch 34a acts against the right face of the piston 62 and thus moves the piston to the left. The rod 64b lifts the throttling pilot plunger 50b from its seat and thus permits fluid to flow from 40b through plunger holes 108b into the port branch 34b by way of rod hole 110b. Pilot plunger chamber 104b is relieved of pressure by way of vent holes 106b. Fluid in port 40b moves the throttling plunger 54b to the left which throttles the flow of fluid from port 40b to port branch 34b in accordance with the flow of fluid through port 40a. Thus the load is lowered at a rate substantially proportional to the opening area of the valve spool.

Figure 5:
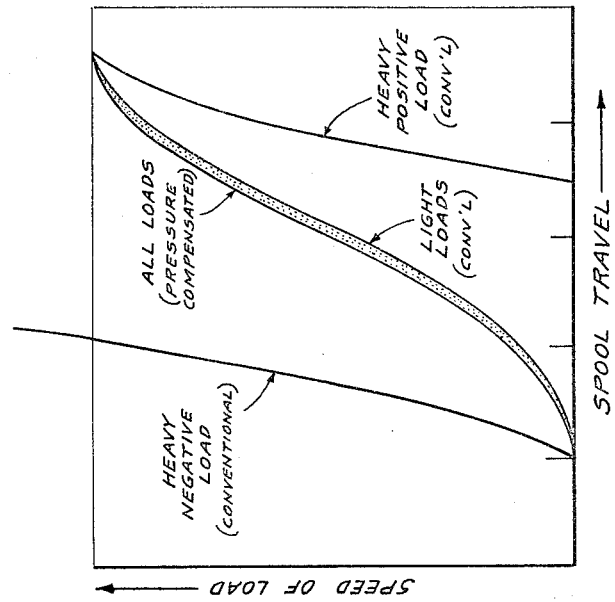
FIGURE 5 is a comparison of the flow response characteristics of a conventional valve and the pressure compensated flow control valve.
Figure 4:
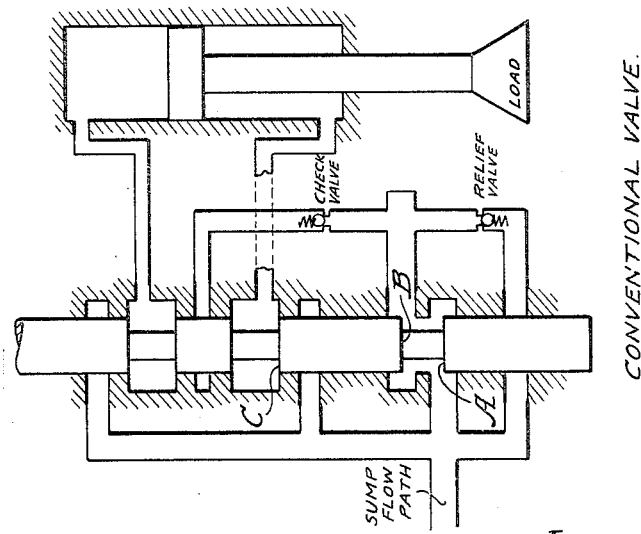
FIGURE 4 is a schematic view of a conventional flow control valve and its associated load.

Conventional flow control valves (FIG. 4), under light positive loads and under light negative loads have desirable response characteristics in that the speed of the load is substantially controlled over the entire range of the travel of the spool (middle curve of FIG. 5). The term "positive load" as used herein is defined as a system wherein fluid, under pressure, is applied to a load actuator to lift a load. The term "negative load" as used herein is defined as a system wherein fluid, under pressure, is applied to a load actuator to lower a load. A heavy positive load shifts this response curve to the right of the response curve of a light positive load. This is because the bypass land A does not provide sufficient throttling of fluid through the valve until the valve spool has traveled a distance relatively greater than the distance required under light positive loads. A heavy negative load swings the response curve to the left of the response curve for a light negative load. This is because with a given opening of sump land C the rate of fluid flow through a restriction in directly proportional to the square root of the difference of pressure of the fluid supporting the load and the pressure of the fluid in the sump. Thus, as the load increases, the pressure of the fluid supporting the load increases and the rate of fluid flow through the restriction increases.

The response characteristic of the present flow control valve under heavy positive loads or under heavy negative loads is substantially the same as under light positive loads and light negative loads. This is achieved at least in part by using the throttling valve which is actuated by a pressure differential between the first port and the second port to govern the flow of fluid through the first and through the second ports in combination with a fluid responsive bypass.

While in the foregoing there have been shown and described preferred embodiments of the method and apparatus of the present invention, it is to be understood that minor changes in the steps and operations involved, and in the details of construction, combination and arrangement of parts may be resorted to without departing from the spirit and scope of the invention.

We claim:

1. A flow control valve comprising a body having a spool bore formed therein a fluid inlet passage, a fluid sump passage, a first port branch and a second port branch in communication with said spool bore; a valve spool slidably positioned within said spool bore; a bypass valve having an inlet chamber in communication with said fluid inlet passage, a sump chamber in communication with said fluid sump passage and a control chamber; and an equalizing line adapted to communicate fluid from said first port branch and from said second port branch to said control chamber; and throttling means responsive to the pressure differential between fluid in said first port branch and fluid in said second port branch to govern the flow of fluid through said first port branch and through said second port branch.

2. A flow control valve comprising a body having a spool bore formed therein; a fluid inlet passage, a fluid sump passage, a first port branch and a second port branch in communication with said spool bore; a valve spool slidably positioned within said spool bore to assume a neutral position, a first position shifted to the right with respect to said body and a second position shifted to the left with respect to said body; a bypass valve having an inlet chamber in communication with said fluid inlet passage, a sump chamber in communication with said fluid sump passage and a control chamber; and an equalizing line adapted to communicate fluid from said first port and from said second port to said control chamber; and throttling means responsive to the pressure differential between fluid in said first port branch and fluid in said second port branch to govern the flow of fluid through said first port branch and through said second port branch.

3. A flow control valve comprising a body having a spool bore formed therein; a fluid inlet passage, a fluid sump passage, a first working port and a second working port in communication with said spool bore; a valve spool slidably positioned within said spool bore; a bypass valve having an inlet chamber in communication with said fluid inlet passage, a sump chamber in communication with said fluid sump passage and a control chamber; and an equalizing line adapted to communicate fluid from said first port and from said second port to said control chamber; means to sense the pressure in said first port and in said second port and to admit fluid from the port having the highest pressure therein into said equalizing line and to prevent the flow of fluid from said equalizing line into said ports; and throttling means responsive to the pressure differential between fluid in said first port and fluid in said second port to govern the flow of fluid through said first port and through said second port.

4. An assembly of flow control valves comprising a plurality of flow control valve sections arranged in a group, each of said flow control valve sections comprising a body portion having a spool bore formed therein, a fluid inlet passage within said body communicating fluid to said spool bore, a fluid sump passage within said body communicating fluid to said spool bore, a first port within said body communicating fluid to said spool bore, a second port within said body communicating fluid to said spool bore, and throttling means responsive to the differential of fluid pressure in said first port and fluid pressure in said second port to govern the flow of fluid through said first port and through said second port, said assembly being further characterized as having a single bypass valve in communication with said fluid inlet passage of said flow control valve sections and in communication with said fluid sump passage of said flow control valve sections and having an equalizing line in communication with each of said first ports of said flow control valve sections and each of said second ports of said flow control valve sections such that fluid may be bypassed from said fluid inlet passage to said fluid sump passage when a predetermined differential exists therebetween.

5. An assembly of flow control valves comprising a plurality of flow control valve sections arranged in a group, each of said flow control valve sections comprising a body portion having a spool bore formed therein, a fluid inlet passage within said body communicating fluid to said spool bore, a fluid sump passage within said body communicating fluid to said spool bore, a first port within said body communicating fluid to said spool bore, a second port within said body communicating fluid to said spool bore, and throttling means responsive to the differential of fluid pressure in said first port and fluid pressure in said second port to govern the flow of fluid through said first port and through said second port, said assembly being further characterized as having means to sense a first differential between the pressure of fluid in said fluid inlet passage of said flow control valve sections and the pressure of fluid in said fluid sump passage of said flow control valve and to permit flow therebetween when a predetermined differential exists and to sense a second differential between the pressure of fluid in said fluid inlet passage of said flow control valve sections and the highest pressure of: (a) the fluid in said first port, (b) the fluid in said second port, and restrict flow of fluid from said fluid inlet passage to said fluid sump passage when said second differential does not exceed a predetermined value and to throttle flow of fluid from said fluid inlet passage to said sump passage when said second differential exceeds a predetermined value.

6. A flow control valve comprising a body having a spool bore formed therein; a fluid inlet passage, a fluid sump passage, a first working port and a second working port in communication with said spool bore; a valve spool slidably positioned within said spool bore; and bypass means responsive to a first differential pressure between the pressure of fluid in said fluid inlet passage and the pressure of fluid in said fluid sump passage and responsive to a second differential pressure between the pressure of the fluid in said fluid inlet passage and the higher pressure of: (a) the pressure of the fluid in said first port, (b) the pressure of the fluid in said second port; and throttling means responsive to the pressure differential between fluid in said first port and fluid in said second port to govern the flow of fluid through said first port and through said second port.

7. A flow control valve comprising a body having a spool bore formed therein; a fluid inlet passage, a fluid sump passage, a first working port and a second working port in communication with said spool bore; a valve spool slidably positioned within said spool bore; a bypass means responsive to the pressure of fluid in said fluid inlet passage, to the pressure of fluid in said fluid sump passage and to the pressure of fluid in said first working port and the pressure of fluid in said second working port to control the flow of fluid from said fluid inlet passage to said fluid sump passage; and throttling means responsive to the pressure differential between fluid in said first port and fluid in said second port to govern the flow of fluid through said first port and through said second port.

8. A flow control valve comprising a body having a spool bore formed therein; a fluid inlet passage, a fluid sump passage, a first working port and a second working port in communication with said spool bore; a valve spool slidably positioned within said spool bore; a bypass valve having an inlet chamber in communication with said fluid inlet passage, a sump chamber in communication with said fluid sump passage and a control chamber; and an equalizing line adapted to communicate fluid from said first port and from said second port to said control chamber; and a pilot operated throttling means responsive to the pressure differential between fluid in said first port and fluid in said second port to govern the flow of fluid through said first port and through said second port.

References Cited in the file of this patent

UNITED STATES PATENTS

| | | |
|---|---|---|
| 2,622,611 | Stark | Dec. 23, 1952 |
| 2,654,349 | Ziskal | Oct. 6, 1953 |
| 2,676,463 | Klessig et al. | Apr. 27, 1954 |
| 2,717,652 | Nichols | Sept. 13, 1955 |
| 2,755,624 | Klessig et al. | July 24, 1956 |
| 2,778,378 | Presnell | Jan. 22, 1957 |
| 2,847,029 | McRae | Aug. 12, 1958 |
| 2,847,030 | McRae | Aug. 12, 1958 |
| 2,892,312 | Allen et al. | June 30, 1959 |
| 2,959,190 | Barnes et al. | Nov. 8, 1960 |
| 2,994,346 | Ruhl | Aug. 1, 1961 |

FOREIGN PATENTS

| | | |
|---|---|---|
| 1,021,723 | Germany | Dec. 27, 1957 |